July 26, 1960 J. B. JONES ET AL 2,946,119
METHOD AND APPARATUS EMPLOYING VIBRATORY
ENERGY FOR BONDING METALS
Filed April 23, 1956 9 Sheets-Sheet 1
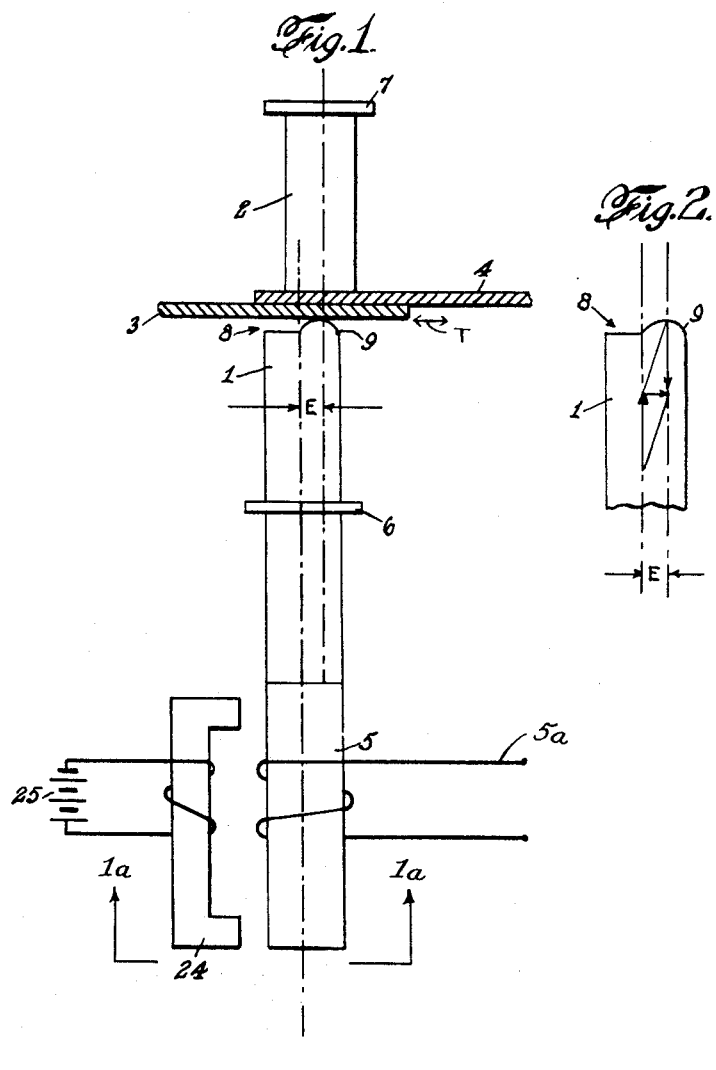
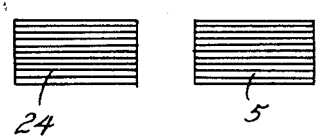
INVENTORS.
JAMES BYRON JONES
WILLIAM C. ELMORE
CARMINE F. DE PRISCO
BY Arthur H. Seidel
ATTORNEY.

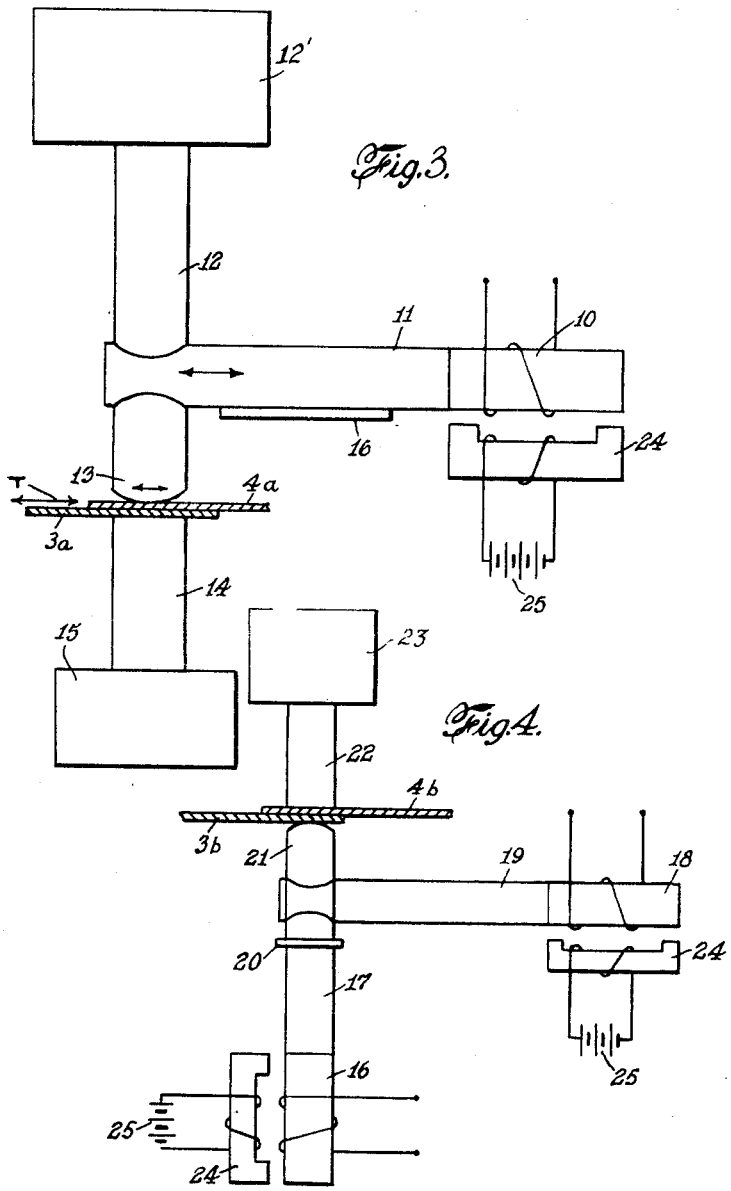
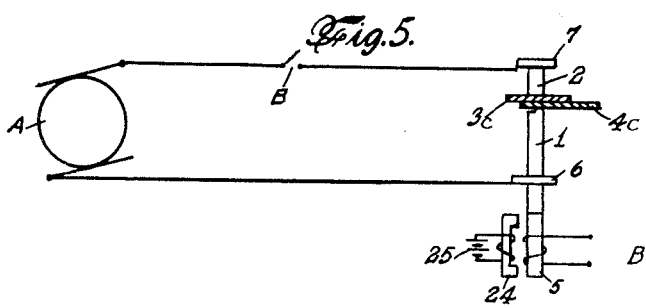

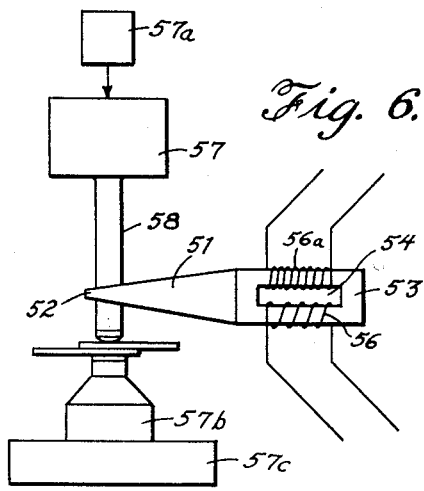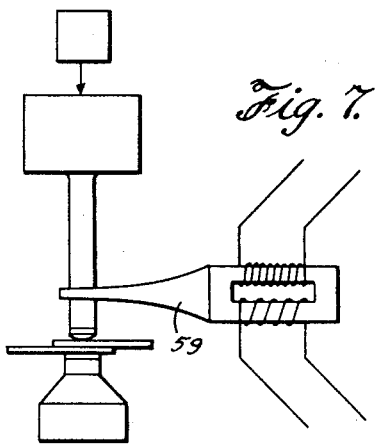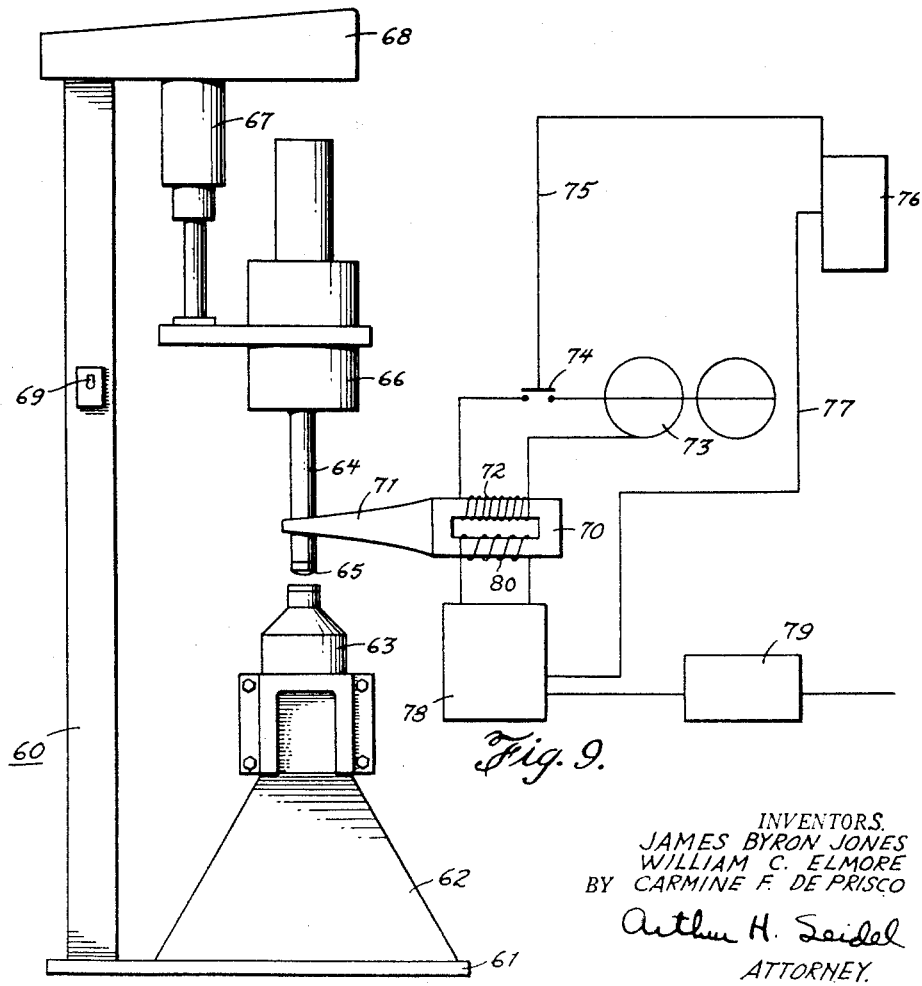

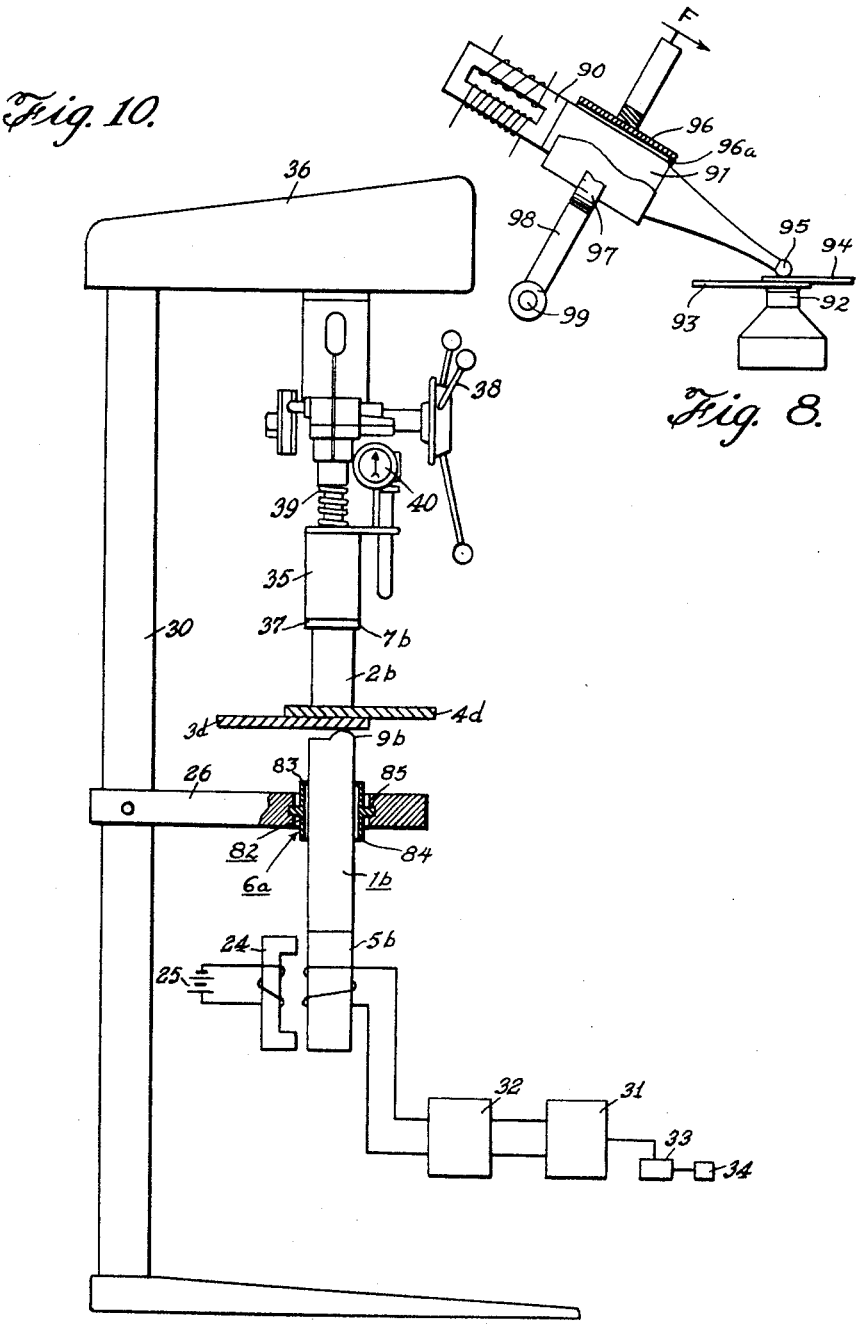

July 26, 1960  J. B. JONES ET AL  2,946,119
METHOD AND APPARATUS EMPLOYING VIBRATORY
ENERGY FOR BONDING METALS
Filed April 23, 1956  9 Sheets-Sheet 6

INVENTORS.
JAMES BYRON JONES
WILLIAM C. ELMORE
CARMINE F. DE PRISCO
BY Arthur H. Seidel
ATTORNEY.

INVENTORS.
JAMES BYRON JONES
WILLIAM C. ELMORE
CARMINE F. DE PRISCO
BY

Arthur H. Seidel
ATTORNEY.

July 26, 1960

J. B. JONES ET AL 2,946,119

METHOD AND APPARATUS EMPLOYING VIBRATORY
ENERGY FOR BONDING METALS

Filed April 23, 1956

INVENTORS.
JAMES BYRON JONES
WILLIAM C. ELMORE
BY CARMINE F. DE PRISCO

Arthur H. Seidel
ATTORNEY.

United States Patent Office 2,946,119
Patented July 26, 1960

2,946,119
METHOD AND APPARATUS EMPLOYING VIBRATORY ENERGY FOR BONDING METALS
James Byron Jones, William C. Elmore, and Carmine F. De Prisco, West Chester, Pa., assignors to Aeroprojects, Inc., West Chester, Pa., a corporation of Pennsylvania
Filed Apr. 23, 1956, Ser. No. 579,780
60 Claims. (Cl. 29—470)

The present invention relates to a method and apparatus employing vibratory energy for bonding metals, and more particularly to a vibratory welding process for joining together or bonding metals including elemental metals, and alloys of elemental metals, where the bond or cohesive joint is accomplished by the application of elastic vibratory energy, with or without the independent application of heat, and to apparatus for effecting the bonding of metals through the application of vibratory energy, with or without means for furnishing heat to the metals being bonded.

Metals including both elemental metals, such as aluminum, copper, titanium, molybdenum, nickel, iron, etc., and metals in the form of their alloys, such as stainless steel, brass, gold-platinum alloys, aluminum-copper alloys, etc., have heretofore been bonded or joined together by a variety of methods, although in some cases the bonds have not been altogether satisfactory. Examples of such methods include the use of non-metallic adhesives; the use of soldering processes in which a solder comprising a molten metal alloy is wetted over the surface of one metal followed by the joinder of the other metal to the solder; the use of brazing processes, which resemble soldering except that in place of relatively low melting point solder, filler metals are used, such filler metals having a relatively high melting point compared with solders but lower than that of the metal or metals being joined together; and the use of welding methods wherein metals are joined together by a localized union or consolidation of the metals. Welding is characterized by a disruption or elimination of the interface between the welded metals. Where similar metals are being welded, it is possible to have grain growth or recrystallization across the weld zone. In the case of weldments involving dissimilar metals there can be diffusion and intersolubility at the interfacial region.

The most widely used of prior welding methods are the various fusion welding processes. These processes resemble each other in that each depends upon the fusion of the metals being welded and differ from each other according to the means employed for supplying the necessary heat to the region being welded to obtain such fusion. Fusion welding is believed to occur because: (1) the metals being joined are rendered in a flowable condition and therefore intimate metallic contact is readily achieved, and (2) surface oxides or other films on the metal surfaces are disrupted and partially or wholly expelled from the weld zone by the dynamic plasticity of the fused metal, so that intimate contact between nascent metallic surfaces is achieved. A fusion weld, whether accomplished by any of the variety of fusion welding processes which are presently available, such as arc welding, resistance welding, oxy-acetylene welding, autogenous welding, atomic-hydrogen welding, etc. is characterized by a cast-type metal structure in the weld zone metal which may differ markedly from the nearby metal structure. Thus, the effect of pronounced heat with its accompanying alterations in metallurgical structure, shrinkage, distortion, etc. may markedly change the properties of the metal in the weld zone, and often cause marked weaknesses in the weldment, as for example, low resistance to corrosion (such as upon contact with water), short life under vibratory loading conditions, etc.

Not only are the weldments derived from fusion welding frequently unsatisfactory, but also fusion welding has marked limitations as to utility. It is most often not feasible to effect the fusion welding of some dissimilar metals because their different melting points and the possibility of formation of intermetallic compounds pose serious, if not insurmountable, problems for this welding technique.

The application of fusion welding processes to metals having high thermal conductivity, such as to the welding of aluminum to aluminum, or copper to copper, is difficult. Moreover, fusion welding is not very practical in the welding of thin foils, such as the welding together of a pair of thin foils, or the welding of a thin foil to heavy plates or rods. By the term foil as used herein is meant a leaf or very thin sheet of metal in any width but no more than about 0.005 inch thick.

In addition to the foregoing, the welding of many materials by fusion welding techniques is rendered difficult, because of the formation of oxide and other films on the surfaces of the metal. Furthermore, in many types of fusion welding processes, and in resistance welding processes in particular, the cleanliness of the materials being welded is a critical factor. For example, the welding of aircraft aluminum alloys by resistance methods requires cumbersome and complex techniques to ensure the absolute cleanliness of the surfaces being welded. The welding of aluminum is not only complicated by cleanliness requirements, and its electrical and thermal properties, as aforesaid, but the facile formation of aluminum oxide is a major complicating factor along with the controls needed to prevent internal defects. As illustrative of the foregoing it should be noted that an ordinary resistance spot welder for ferrous alloys in the range of 50 to 75 kva. costs on the order of from $4,000 to $6,000, while a machine having the same order of magnitude of power for resistance welding aircraft aluminum alloys generally costs in the range of $10,000 to $15,000.

Furthermore, a number of the more widely used fusion welding methods have distinct limitations which prevent, or render difficult, their use with certain materials. Thus, resistance welds are difficult to accomplish satisfactorily with metals of low electrical resistance. The limitations of fusion welding methods have rendered the various fusion welding techniques most difficult to standardize, and have required welders to have a broad knowledge of not only the individual welding techniques, but of the electrical, chemical, and physical properties of materials sought to be welded.

In recent years there has been developed the so-called cold welding process or pressure welding process in which welds are effected below the fusion temperature of the metals being joined by the application of high pressures. Pressure welds are achieved by high clamping loads, which even in the case of relatively soft metals generally comprise 50,000 to 200,000 pounds per square inch, and which necessarily cause great deformation.

The extent of deformation encountered for good pressure welding is frequently excessive; for example, room temperature pressure welds involving copper, aluminum, iron, nickel, or zinc sheet normally have deformations of the order of 50% and frequently 80% or more. Some metals, such as magnesium, have been reported to be virtually impossible to pressure weld at room temperatures.

Accordingly, while pressure welding has utility in certain areas, its deficiencies arising from the necessities for surface preparation, limited applicability to certain materials and non-applicability to other materials, and most significantly the high deformations, greatly limit the utility of this method.

Due to the deficiencies of both fusion welding and pressure welding there are a number of valuable metallic materials which cannot be satisfactorily welded by any prior process. For example, sintered aluminum powder which is presently marketed under the designation M–257 by the Aluminum Company of America, Pittsburgh, Pennsylvania, and which is a sintered aluminum powder containing about 7.8 weight percent of aluminum oxide, was reported as being unable to be satisfactorily welded by any known welding process prior to the process of the present invention. Similarly, the welding of thin foils to other thin foils, and to a somewhat lesser degree to thicker materials, and the welding of titanium alloys likewise have been reported as not being practical prior to the advent of the process of the present invention.

This invention has as an object the provision of a novel method for bonding metals.

This invention has an another object the provision of a method for bonding metals in which changes in metallurgical structure, distortion, and deformation are avoided or minimized.

This invention has as a further object the provision of a method for bonding metals which is effected at temperatures below the fusion temperature.

This invention has as another object the provision of a method for the solid state bonding of metals, which may be effected at lower applied static pressures than those necessitated when the metals are joined together solely by the application of pressure.

This invention has as a further object the provision of a method for joining metals without the necessity for complicated methods for cleansing the metal surfaces which are joined together.

This invention has as a yet further object the provision of a method for welding metals having tough adherent coatings of metal oxides on their exterior surfaces.

This invention has as a still further object the provision of a method for welding dissimilar metals together.

This invention has as still another object the provision of a method for welding a foil to another foil, or welding a foil to a relatively thick metal member.

This invention has as another object the provision of a method for rapidly preparing weldments.

This invention has as a yet further object the provision of a method for producing welds having a high shear strength, such as a shear strength of the same order of magnitude as the materials being welded.

This invention has an another object to provide a method whereby metals having a low electrical resistance may be satisfactorily and rapidly welded.

This invention has as another object the provision of a method for welding metals such as sintered aluminum powders, and titanium alloys, which are reported to be difficult to weld by other methods.

This invention has as a further object the provision of apparatus for effecting the solid state bonding of metals at relatively low pressures, and with the absence or minimization of deformation.

This invention has as a yet further object the provision of apparatus capable of effecting vibratory welding.

This invention has as a still further object the provision of apparatus capable of effecting welding between dissimilar metals.

This invention has as still another object the provision of apparatus capable of effecting welding with metals having high thermal conductivity.

This invention has as another object the provision of apparatus for bonding together metals having dissimilar electrical or thermal or chemical or metallurgical properties.

This invention has as another object the provision of apparatus for welding metals which will consume a minimum of power and be easy to operate.

This invention has as a yet further object the provision of apparatus for effecting weldments from metals having tough adherent coatings of metal oxides.

This invention has as still another object the provision of welding apparatus in which the loss of energy in the apparatus is maintained at a relatively minor amount.

These and other objects of the present invention are accomplished by the process and apparatus of the present invention wherein metals, by which is meant to include in both the specification and claims, both elemental metals and metallic alloys, and also metallic materials such as sintered aluminum powder, are welded together to form a firm bond in which the interface between the welded metals in the region of the weld is disrupted, and grain growth or recrystallization is possible across the weld zone in the case of the welding together of similar metals, and diffusion and intersolubility in the weld zone in the case of dissimilar metals. The welds of the present invention are accomplished through the application of elastic vibratory energy having a frequency extending over a broad range, such as the range between 59 and 300,000 cycles per second. The apparatus of the present invention comprises means for effecting the aforesaid vibratory welding of metals.

The welding process of the present invention is effected under a clamping pressure sufficient to hold the metals being welded in firm contact at the intended weld interface.

The clamping pressure may thus be varied over a very wide range. Thus, in a preferred embodiment of the present invention, the maximum clamping pressures need not produce a deformation [1] of more than about 10% in weldments effected at room or ambient temperatures. In many cases the extent of deformation is appreciably below 10% and in some instances may be virtually absent altogether. The minimal clamping pressure to be used in the process of our invention constitutes a pressure sufficient to maintain the metals being welded in operative disposition, e.g. contacting each other so that the weld may be effected by the application of vibratory energy.

The range of operative clamping pressures which may be employed in the process of the present invention may be readily ascertained by the user of the process. In all cases the clamping pressure must be sufficient to effect coupling between the metals being welded and the source of vibratory energy, so that such vibratory energy may be transmitted to the metals.

As illustrative of the clamping pressures employed in the process of our invention, sheets of commercially pure aluminum having a single sheet thickness of 0.040 inch may be welded together at normal ambient conditions by the process of our invention to produce welds having a unit shear strength of 8,047 pounds per square inch of weld area and a deformation of less than 4% by the application of an applied average static compressive stress of 6,900 pounds per square inch over the weld area without the application of heat. In order to effect satisfactory pressure welding with comparable high purity aluminum at normal ambient conditions, a pressure of the order of 60,000 pounds per square inch, resulting in a deformation of about 60% is necessitated.[2]

Satisfactory weldments may be produced in many metals in accordance with the process of our invention without a significant degree of deformation.

As heretofore indicated, the operative range of vibratory welding frequencies which may be used in the process of our invention includes frequencies within the range 59 to 300,000 cycles per second, with the preferred range constituting 400 to 75,000 cycles per second, and the optimum operating frequency range lying between about 5,000 and 40,000 cycles per second. This optimum range of operating frequencies may be readily achieved by mag- ---
[1] By deformation is meant the loss in thickness of the weldment at the center of the weld zone divided by the aggregate thickness of the sheets prior to welding; result multiplied by 100 to obtain percentage.
[2] See Tylecote, *Metal Industry*, July 25, 1952, page 72.

tetostrictive transducer elements of known design, which are capable of generating elastic vibratory energy of high intensity. The construction of suitable magnetostrictive transducer elements and their relationship to the apparatus of our invention will be discussed more fully below.

Welding in accordance with the process of our invention may be and in many instances is initiated at room temperatures or ambient temperatures without the application of heat.[3] If desired, welding in accordance with the process of our invention may also be initiated at elevated temperatures below the fusion temperature (melting point or solidus temperature of any of the pieces being bonded).[4] Thus, heating the metals to be welded prior to, and/or during welding to a temperature below their fusion temperature may, in some cases, facilitate the ease of welding and lower the power requirements and/or time requisite to achieve welding. The welding process of our invention is applicable to forming both spot and seam welds.

The welding process of our invention may be applied to a wide variety of metals, examples of which include: pure aluminum to pure aluminum; aluminum alloy to aluminum alloy; copper to copper; brass to brass; magnesium alloy to magnesium alloy; nickel to nickel; stainless steel to stainless steel; silver-titanium alloy to silver-titanium alloy; gold-platinum alloy to stainless steel; platinum to copper; platinum to stainless steel; gold-platinum alloy to nickel; titanium alloy to titanium alloy; molybdenum to molybdenum; aluminum to nickel; stainless steel to copper alloy; nickel to copper alloy; nickel alloy to nickel alloy; etc.

Moreover, the welding process of our invention may be applied to metals of a wide range of thicknesses, such as to the welding together of very thin foils up to the welding of sheet metals having a thickness of up to about 0.100 inch and more to other metals having appreciably greater thicknesses. It is applicable to metals of a variety of contours, such as flat sheets, curved sheets, etc.

The welding process of the present invention may be accomplished within a wide time range, such as a time range of between about 0.001 second to about 6.0 seconds, or somewhat more, with welding under most normal conditions being effected during a time interval of from several hundredths of a second to several seconds.

The welding of most metals can be effected in accordance with the process of our invention in the ambient atmosphere. However, the process of our invention comprehends welding in highly evacuated atmospheres, or in selected atmospheres, such as atmospheres comprising an inert gas. Furthermore, while the welding process of our invention may be effected with metals, such as aluminum, without the extensive precleaning required to effect satisfactory welding by other methods, a degree of precleaning and surface treatment may prove advantageous in the welding of many metals. It is desirable prior to effecting welding in accordance with the present invention to remove all surface contaminants, such as hydrocarbon lubricants and the like.

The elastic vibratory energy to be introduced to the sheets being welded must include an elastic vibratory component generally in the plane of the portion of the vibrating jaw which engages the workpieces or metal members being welded. In the case where flat sheets are being welded together, such plane will be generally parallel to the plane of the contacting surfaces of such sheets. Such elastic vibratory component may be typified as a lateral elastic vibratory component, rather than an axial one, e.g. the critical elastic vibratory component used in the welding process of the present invention moves in the same direction as the plane of the portion of the vibrating jaw which engages the workpieces. Dependent to a degree upon the metals being welded and their surface composition and finish characteristics, it is sometimes preferable to introduce virtually all of the vibratory energy in the plane of the portion of the vibrating jaw which engages the workpieces. In other cases, the vibratory energy should comprise two vibratory components, one in the plane of the portion of the vibrating jaw which engages the workpieces, and the other introduced along the axial plane of the jaws retaining the metals in contacting disposition. In the last-mentioned two component welding arrangement, the elastic vibratory components are normal or generally normal to each other.

In alternative embodiments of the welding process of our invention, the introduction of multicomponent elastic vibration having more than two components into the welding zone may be effected. In all cases, the vibratory energy should include a component which is introduced in the plane of the portion of the vibrating jaw which engages the workpieces, and which in the case where flat sheets are being welded together will be introduced in a plane generally parallel to the contacting surfaces of the metals being welded.

We do not wish to be bound by any theory as to the mechanism of operation of the welding process of our invention, but it is our belief that the lateral elastic vibratory component disrupts the interfacial film geometry and more or less destroys the interfacial film permitting nascent metal surfaces to come together so that welding thereof may be effected. We also hypothesize that simultaneously with the disruption of the interfacial film geometry the vibratory energy traveling as above-indicated in some fashion not understood by us renders such surfaces receptive to undergoing joinder, further facilitating the welding together of the surfaces.

The apparatus of the present invention comprises means for effecting vibratory welding and includes a transducer. A wide variety of useful transducers are known to those skilled in this art, a preferred embodiment consisting of a magnetostrictive metal, such as nickel, the alloy 2–V Permendur (an iron-cobalt alloy), nickel-iron alloy, or Alfenol (an aluminum-iron alloy), properly dimensioned to insure axial resonance with the frequency of the alternating current applied thereto, so as to cause it to decrease or increase in length according to its coefficient of magnetostriction. Transducers of the aforesaid type constitute a preferred embodiment for operation at frequencies of up to about 75,000 cycles per second. In place of the aforesaid metallic magnetostrictive materials, the transducer may comprise almost any material which has good physical properties and which changes its physical dimensions under the influence of an electric potential. Thus, it may comprise a piezo-electric ceramic, such as barium titanate, or lead zirconate, or a natural piezo-electric material, such as quartz crystals. Such materials are preferably used at high frequency operations, as at frequencies above about 75,000 cycles per second. The transducer may also consist of an electromagnetic device, such as that when actuates a radio loudspeaker.

In addition to the transducer, the welding apparatus of the present invention includes a coupling system for conducting the vibratory energy from the transducer to the metals being welded. The coupling system should resonate at the transducer's operating frequency and should preferably be insensitive to applied forces, so that the welding apparatus may operate efficiently under the welding process conditions and dispense vibratory energy in the tangent plane of the portion of the vibrating jaw which engages the metals being welded without adverse affect upon the transducer, such as the stalling, or damping, or shifting of the resonant frequency of the transducer-coupling system. In addition, in the preferred embodiment of the apparatus of the present invention, only

---

[3] The weldment may be warm to the touch after the weld due to the application of the elastic vibratory energy.
[4] The temperatures to which the foregoing statements refer are those which can be measured by burying diminutive thermocouples in the weld zone prior to welding, as well as the temperatures which can be estimated or approximated from a metallographic examination of a cross-section of a vibratory weld in the ordinary magnification range up to about 500 diameters.

a minor amount of energy is lost to the mounting system, and the delivered vibratory energy from the welding apparatus is localized in the weld zone.

For the purpose of illustrating the invention there are shown in the drawings forms which are presently preferred; it being understood, however, that this invention is not limited to the precise arrangements and instrumentalities shown.

Referring to the drawings, which are partly schematic, and wherein like reference characters refer to like parts:

Figure 1 is an elevational and partly sectional view showing one embodiment of the present invention.

Figure 1a is a view along line 1a—1a of Figure 1.

Figure 2 is an elevational fragmentary view of a portion of the welding embodiment shown in Figure 1 with a vector diagram showing the combined axial-lateral vibratory motion of one of the basic components.

Figure 3 is an elevational view, partly in section, of another embodiment of the welding apparatus of the present invention.

Figure 4 is an elevational view partly in section, of another embodiment of the welding apparatus of the present invention.

Figure 5 is a diagrammatic view showing an electric heating circuit wherein preheating or heating of the weld area may be effected.

Figure 6 is an elevational view of another embodiment of the welding apparatus of the present invention.

Figure 7 is an elevational view of another embodiment of the welding apparatus of the present invention.

Figure 8 is an elevational view of another embodiment of the welding apparatus of the present invention.

Figure 9 is an elevational view, partly in section, of an assembly comprising an embodiment of the welding apparatus of the present invention.

Figure 10 is an elevational view, partly in section, of another assembly comprising another embodiment of the welding apparatus of the present invention.

Figure 11:
Figure 11 through 35 are photomicrographs of welds produced by the process of the present invention.

Referring initially to Figures 1, 1a and 2 the welding apparatus shown therein comprises means for introducing two component vibration into the weld zone. In the embodiment there-illustrated, the welding apparatus comprises a pair of jaws 1 and 2, one above the other, between which the metals 3 and 4 to be welded are placed. The lower jaw 1 is employed as a vibration source and the upper jaw 2 as a support or anvil. A transducer 5 drives the jaw 1.

Modifications as to composition and positioning of these elements are possible, of course, without departing from the scope of the invention. In particular, the positioning of jaws 1 and 2 may be inverted, with jaw 2 being beneath the metals 3 and 4 which are to be welded. Furthermore, both the jaws 1 and 2 may be activated vibratorily in opposition within the scope of the invention.

The supporting jaw 2 may be a massive member or a rod, and the metals 3 and 4 which are to be welded, may be operatively positioned by the application of clamping pressure on jaw 2 as by hydraulic, air, or other pressure means.

In the instant embodiment of the present invention, the transducer 5 is a stack of nickel laminations each about 0.01 inch thick. Alternatively, as heretofore noted, other magnetostrictive materials may be used, such materials being cut to physical dimensions which minimize electrical losses and insure axial resonance with the applied alternating frequency.

The transducer 5 is energized with applied R.F. energy introduced through electrical conductor 5a. The transducer 5, when of nickel, should be magnetically polarized in order for the metal to efficiently convert the applied R.F. energy into elastic vibratory energy. Consequently, a magnetic biasing means is provided for transducer 5 in the form of a magnetic biasing coil for providing a magnetic flux to transducer 5, said magnetic means being either a permanent magnet or an equivalent electromagnet 24 with a direct current supply 25 therefor, for example, a direct current generator or battery for supplying the polarizing flux, said biasing means being schematically illustrated.

The metal jaw 1 is bonded to transducer 5 with a metal-to-metal bond in end-to-end contact and at the point of bond is substantially coaxial and coextensive therewith, said metal jaw 1 and transducer 5 hereinafter being referred to as the transducer-coupling. The transducer-coupling is provided with a support means 6, for example, in the form of a collar, located at the one-quarter wave length position of the said coupling. Alternatively, and preferably, the support means 6 may comprise the sleeve-type mount sometimes referred to as the Elmore mount, which is described in co-pending United States application for Letters Patent, Serial No. 517,599, filed June 23, 1955, now abandoned, in the name of William C. Elmore, and which is described in detail in the embodiment illustrated in Figure 10.

Supporting means for jaw 2, such as collar 7, which is fixedly secured thereto, may be retained in an external frame or support whereby jaw 2 may be raised or lowered, or fixedly secured in an anchorage support. In one embodiment of the present invention, the length of jaw 2 may be regulated so that its length is equal to one-quarter wave length, or an odd number of one-quarter wave lengths in its metal composition at the applied frequency, in another embodiment the jaw 2 may comprise a massive anvil functioning structure.

The axial vibration, i.e. the vibratory component generally normal to the interfacial plane of the elements 3 and 4 which are to be welded together, is accomplished by longitudinal waves moving axially from transducer 5 along the length of lower jaw 1 towards the elements 3 and 4.

The lateral vibratory component is induced at the free or working end 8 of the jaw 1 by the means 9 constituting a tip or projection positioned eccentrically of the jaw axis of jaw 1, whereby the axial vibration of the jaw 1 is distorted by the eccentricity of the coupler jaw axis and the means 9, so that jaw 1 vibrates in the manner illustrated by E in the vector diagram of Figure 2, the tangent plane of the tip 9 being designated T in the drawings.

As heretofore noted the operating frequency should be within the range 59 to 300,000 cycles per second and preferably within the frequency range of between 400 and 75,000 cycles per second, with the optimum operating frequency range being between 5,000 and 40,000 cycles per second. With existing available transducer equipment, operations within the entire optimum operating frequency range may be readily effected, so that the relatively facile operational utility of this range renders it desirable for operational equipment.

The energy level will, of course, vary for different transducer and coupler configurations, and different coupler materials. Thus, it is possible to operate over a broad range of energy levels in the various embodiments of the present invention, as for example, over the energy level range of from 75 watts into the transducer to 5,000 and more (corrected for power factor) R.F. watts. For example, with a nickel stack 2¼ inches square, having a design frequency of 15 kilocycles, with nickel laminations having a thickness of 0.010 inch, an energy level of 75 to 1,500 R.F. watts corrected for power factor may be utilized.

While the transducer and coupling systems of the present invention are efficient so that little energy is lost to the coupling and mounting system, and the delivered energy is localized in the weld zone, nevertheless, there is some loss of energy so that the acoustical wattage delivered to the weld area is less than the wattage delivered to the transducer.

In the embodiment of the welding apparatus shown in Figure 3, the transmitted elastic vibratory motion is primarily lateral, being provided by means of the transducer 10 and the coupling member 11, which comprises a metallic rod. Transducer 10 is provided with an electromagnet 24 and direct current supply 25 therefor similar to that provided for in the embodiment shown in Figure 1. The coupling member 11 is angularly connected, as at right angles, to a vibration-transmitting member or coupling member 12 which may comprise a metal rod, rigidly supported and downwardly urged by means of the massive support 12'.

Coupling member 11 is preferably rigidly secured as by brazing, or the like to vibration transmitting member 12, with the end portion of coupling member 11 engaging the vibration-transmitting member 12.

The vibration-transmitting member 12 is excited as a reed and bends in respect to its rigid support 12', and transmits the elastic vibration of the coupling member 11 in a direction along its axis. However, the primary or major portion of the vibratory energy transmitted to the metal elements 3a and 4a undergoing welding is lateral vibrations (see arrows indicating direction of movement) introduced in the tangent plane T of end 13 of vibration-transmitting member 12, which in the case of flat sheets 3a and 4a constitutes elastic vibrations generally parallel to the contacting surfaces of the elements 3a and 4a.

The coupling member 11 may be supported upon a supporting plate 16.

An anvil or supporting member 14 is axially spaced from the end 13 of vibration-transmitting member 12. Anvil member 14 is provided with a base 15 upon which it may be supported. Anvil member 14 may comprise a heavy mass, a short rod-like member, or the like. When the anvil member 14 assumes the form of a heavy mass it need have no particular length. When in the form of a short rod-like member, it may be desirable in some instances to regulate the length of the anvil member so that it is detuned in bending vibration at the applied frequency in respect to rigid support 15, e.g. to be non-resonant with the applied vibratory frequency of the transducer-coupling system, and thus reflect much of the elastic vibratory energy introduced to the elements 3a and 4a undergoing welding.

In the embodiment of the apparatus of the present invention shown in Figure 4, a plurality of transducers 16 and 18 are utilized. Thus, the transducer 16 is bonded to a coupling member 17, and the transducer 18 is bonded to a coupling member 19.

Each of transducers 16 and 18 is provided with a magnetic biasing means, such as a permanent magnet or an equivalent electromagnet 24, with a direct current supply 25 therefor as has heretofore been described.

The coupling member 19 is rigidly and fixedly secured to coupling member 17 as by its end portion embracing coupling member 17 intermediate the end 21 and the supporting means 20 therefor. Supporting means 20 may comprise a collar positioned at the one-quarter wave length position. Alternatively, supporting means 20 may comprise a mount, such as the Elmore mount described in copending United States application for Letters Patent Serial No. 517,599, filed June 23, 1955, in the name of William C. Elmore.

A non-resonant anvil 22 rigidly supported by massive support 23 may be axially spaced from end 21 of coupling member 17 permitting the members 3b and 4b undergoing welding to be positioned there-between. In this embodiment the end 21 of coupling member 17 is provided with a positive axial and lateral vibratory motion which may be transmitted under static pressure, as hereinbefore described, to the elements 3b and 4b.

In the embodiment shown in Figure 5 there is provided means for heating the elements 3c and 4c which are being welded to a temperature less than the fusion temperature of either of the elements 3c or 4c, such heating being applied before and/or during the time the vibratory energy is supplied to the elements 3c and 4c.

The embodiment shown in Figure 5 constitutes the application of means for preheating and/or heating to the welding apparatus embodiment shown in Figure 1, but it is to be understood that the heating arrangement shown in Figure 5 may also be applied to the other apparatus embodiments of the present invention.

Referring to Figure 5, it will be seen that a source of electric current A provided with a switch, cutoff or timer mechanism B is connected to the jaws 1 and 2. Where preheating is accomplished in this manner, it is advisable that jaws 1 and 2 be formed from metallic materials having an electrical resistivity of between $1.4 \times 10^{-6}$ and $29 \times 10^{-6}$ ohm centimeters.

The embodiment of the present invention shown in Figure 6 is generally similar to that shown in Figure 3, except that in place of coupling member 11 which in Figure 3 comprised a metallic connecting member of generally uniform cross-section, a tapered metallic coupling member 51 having a circular opening at its end 52 remote from transducer 53 is substituted. Moreover, in the embodiment of the present invention shown in Figure 6, the transducer 53 comprises a laminated core of nickel or other magnetostrictive metallic elements having a rectangularly-shaped opening 54 in its center portion. The polarizing coil 55 and an excitation coil 56 may be wound through the opening 54 within transducer 53. Upon variation of the magnetic field strength of the excitation coil 56, there will be produced concomitant variations in the dimension of the transducer 53, provided the polarizing coil 56a is charged at a suitable level with D.C. current, and that the frequency of the aforesaid variations, namely the expansion and/or contraction of the magnetostrictive transducer 53 will be equal to the frequency of the alternating electric current flowing in excitation coil 56.

The welding apparatus embodiment shown in Figure 6 operates in the same fashion as the welding apparatus embodiment shown in Figure 3, the mass 57 on uppermost end of vibration-transmitting member 58 rigidly supporting it in bending and with suitable mechanical means designated diagrammatically as 57a and which may consist of spring means, air cylinder or hydraulic cylinder or like means furnishing the positive clamping pressure, the reaction of which is taken by the anvil 57b and its support means 57c.

The embodiment shown in Figure 7 resembles that shown in Figure 6 except that in place of the tapered coupling member shown therein, there is substituted a curved coupling member 59 whose taper is an exponential function of the length and satisfies the relation.

$$S = S_0 e^{-2Tl}$$

where $S_0$ is the reduced area, $S$ is the original area, $T$ is a constant for the taper, and $l$ is the length of the tapered section.[5] The total length of the coupling member should be an integral number of half-wave lengths of the transducer's frequency so that the joint between the transducer and the coupling member will come at a loop of the wave motion and will not be appreciably strained.

The curved coupling member designated 59 in Figure 7 and the tapered coupling member 51 in Figure 6 comprise effective means for transmitting vibratory energy from the transducer to the reed member. Other forms of efficient coupling members may likewise be used.

In the embodiment of the present invention shown in Figure 8, the transducer-coupler 90—91 comprising transducer 90 consisting of a nickel stack and coupler 91 is

---

[5] This equation is set forth at page 163, Piezoelectric Crystals And Ultrasonics, by Warren P. Mason, published in 1950 by Van Nostrand Company, and the design of the tapered coupling member is discussed therein, including a drawing thereof which Mason designates as a "Metal 'horn' for obtaining a large strain in a metal sample."

angularly retained in respect to anvil 92. The workpieces 93 and 94 are maintained between the space between anvil 92 and the end 95 of coupler 91. Coupler 91 is supported by the Elmore mount collar 96, comprising a collar of one-half wave length at the operating frequency fixedly secured at end 96a to coupler 91. The collar 96 is anchored by means of a centrally positioned lip or flange 97, which is supported on member 98 which may be pivoted about pivot 99.

We have found that vibratory welding may be accomplished with the array shown in Figure 8 notwithstanding the bending stress put on the Elmore mount 96—97, and coupler 91 by the downward urging of its end 95 against the workpieces 93 and 94 by the force designated F about the pivot 99.

In the embodiment shown in Figure 9, there is shown an assembly or array comprising a frame 60 having a base 61 on which is mounted a support 62 carrying the anvil 63 which constitutes a substantial mass. The welding apparatus in the array of Figure 9 is that of Figure 7 and includes vibration transmitting member 64 having a hemispherical or arcuate tip 65 at its lowermost free end and a mass 66 at its uppermost end.

The mass 66 is urged upwardly and downwardly by means of hydraulic cylinder 67 which is anchored to thrust plate 68 of frame 60. The raising and lowering of hydraulic cylinder 67 is regulated by means of electrical control switch 69 which may control solenoid valve means or other valve means in the oil system which includes hydraulic cylinder 67.

The transducer and coupling member of the embodiment shown in Figure 9 is that of the embodiment shown in Figure 6. This comprises a nickel stack 70 as the transducer, and a tapered coupling member 71 fixedly and rigidly secured to vibration-transmitting member 64, which is disposed at right angles in respect thereto.

The transducer 70 is provided with a polarizing coil 72 joined to a source of D.C. current 73 and provided with a switch 74.

Switch 74 is connected by line 75 to timer 76, which in turn is connected by line 77 to an alternating current generator 78, which is supplied by power supply unit 79. Generator 78 furnishes high frequency alternating electric current to excitation coil 80 of transducer 70.

In the embodiment shown in Figure 9, controlled on-and-off regulation of the excitation coil 80 may be accomplished by means of timer 76 in order to permit the embodiment shown therein to be used for assembly line or industrial production.

In the embodiment of the invention, as depicted in Figure 10, the collar designated generally by the numeral 6a embraces the coupling member of jaw 1b as follows: a cylindrical shell 82 is provided, such shell having a length one-half wave long according to the metal used at the applied frequency. Cylindrical shell 82 surrounds part of jaw 1b as shown is attached to it at its uppermost end 83 by appropriate means, as by welding, brazing, or soldering. The lowermost end 84 of cylindrical shell 82 is free from any attachment and, accordingly, when the system is vibrating, a true node will develop in the cylindrical shell 82 at the region of the attachment means 85, one-quarter wave length distant from the free end 84 of the cylindrical shell 82.

The attachment means 85 comprises a raised lip or flange on the outer peripheral surface of shell 82, preferably integral with the shell 82, and extending around the periphery of the shell 82.

The attachment means 85 is secured to an adjustable table 26, the shell 82 and the jaw 1b passing through an opening in the table 26.

The collar 6a described above comprises the form of mount, sometimes referred to as an Elmore mount, which is described in the copending United States patent application Serial No. 517,599, filed June 23, 1955, now abandoned, in the name of William C. Elmore, entitled "Vibratory Device."

The table 26 is adjustably mounted on an upright 30. An alternating current power supply 31 provides alternating current for energizing the high-frequency generator 32 which supplies the magnetostrictive transducer 5b with R.F. The transducer 5b, if nickel should as heretofore noted, be magnetically polarized in order for the metal to expand and/or contract in accordance with the applied R.F. frequency. Consequently, as hereinbefore described, magnetic biasing means is provided for the transducer 5b in the form of a magnetic means for providing a magnetic flux to the transducer 5b, said magnetic means being a permanent magnet or an equivalent electromagnet 24 with a direct current supply 25 therefor, e.g. a direct current generator or a battery, for supplying the polarizing flux. In order to drive the transducer-coupling 5b—1b for selected periods, a timer member 33 including foot switch means 34 therefor, schematically illustrated, is used to control the application of R.F. power to the transducer 5b.

The collar 7b of the reflector anvil or upper jaw 2b is secured to a spindle 35 attached to a head 36 forming part of the upright 30 in such manner that the reflector anvil 2b is in spaced substantially axial alignment with the transducer-coupling 5b—1b. The anvil 2b is insulated from the spindle 35, as by insulation means 37. Coupling member or jaw 1b is provided with a hemispherical tip 9b which contacts the metal workpieces 3d and 4d which are to be welded together.

As will be seen from Figure 10, the tip 9b is positioned eccentrically of the longitudinal axis of coupling member 1b whereby the axial vibration of the coupling member or jaw member 1b is distorted to cause it to vibrate as illustrated by E in the vector diagram of Figure 2.

In operation, the workpieces 3d and 4d are placed between the spaced jaws 1b and 2b and the upper jaw 2b is forced downwards by means of lever wheel 38 and threaded shaft 39 which is threadably received within spindle 35 until the selected clamping load as indicated on the dial gauge 40 is obtained. At this point the foot switch 34 may be tripped by the operator to actuate the timer 33.

While magnetostrictive means have been described for obtaining the elastic vibrations used in the welding process of the present invention, it is to be understood that other means may be utilized therefor, as for example, the various electrical and mechanical generators of elastic vibrations, such as other forms of magnetostrictive generators, piezoelectric generators, electrostrictive transducers, electromagnetic generators, electrodynamic generators, mechanical generators employing off-center weights rotating about an axle, etc.

It is, of course, to be understood that varying properties of metals used in the apparatus of the present invention may require altering the dimensioning of the various elements of the apparatus of the invention.

In the following table there are presented comparisons of the results obtained with the pressure welding of aluminum (based upon the average of a large number of welds) and the vibratory welding of aluminum in accordance with the present invention:

|  | Pressure Welding of Aluminum (0.046" thick, half-hard, commercially pure) | Vibratory Welding of Aluminum (0.040" thick, half-hard, 2S) |
| --- | --- | --- |
| Surface preparation | Degrease and scratch-brush. | Degrease only. |
| Welding pressure | 80,000 pounds/square inch. | 350 pounds clamping load.[1] |
| Weld Area | 0.031 square inches. | 0.036 square inches. |
| Deformation | 67% | Less then 4%. |
| Weld unit shear stress | 8,400 pounds/square inch. | 8,047 pounds/square inch. |

[1] Equal to a static compressive stress of 6,900 p.s.i.

While the above applies only to aluminum of a specific thickness, the differences in applied unit forces and deformation with comparable strengths are apparent.

In the following table the Government specifications for the fusion spot welding of 0.040- and 0.032-inch aluminum are compared with welds obtained by the vibratory welding process of the present invention:

|  | Government Specifications Mil-W-6860 for Fusion Spotwelding of Aluminum | |
|---|---|---|
|  | 0.040" thick 2S-1/2H | 0.032" 24S-T |
| Minimum shear strength | 225 pounds | 260 pounds. |
| Lowest average shear strength | 300 pounds (avg. of 20 welds). | 347 pounds (avg. of 20 welds). |
|  | Vibratory Welding of Aluminum | |
|  | 0.040" thick 2S-1/2H | 0.032" 24S-T |
| Minimum shear strength | 340 pounds | 330 pounds. |
| Lowest average shear strength | 346 pounds (avg. of 15 welds). | 373 pounds (avg. of 10 welds). |

The strength of vibratory welds for both 0.040 inch 2S-½H aluminum and 0.032 inch aircraft structural 24S-T aluminum alloy, as indicated above, is actually above the strength requirements for fusion spot welds, and the vibratory welds produced by the process of the present invention do not exhibit the cast nugget structure typical of fusion spot welds.

The welding of a large variety of metals has been accomplished by the vibratory welding process of the present invention.

Referring to the photomicrographs, which are set forth in Figures 11 to 35, it will be seen therefrom that the bond zone or weld region reveals, especially at the interfacial region, a substantial degree of internal deformation. It has been found that grain growth may occur across the bond or weld zone where the metals being welded together are similar, and a high degree of diffusion or intersolubility occurs where the metals being welded together are different.

Referring now particularly to the individual photomicrographs:

Figure 11 is a photomicrograph of a complete weld, revealing both the external and internal effects, and is an example of a weld which may be achieved in accordance with the present invention, in which there are very small amounts of external deformation, but in which there is substantially complete internal deformation and elimination of the sheet-to-sheet interface. The weld constitutes a bond between two 0.007-inch sheets of an alloy whose nominal composition is 95% silver and 5% titanium. The photomicrograph is magnified 70 times, and the etch used to obtain the photomicrograph comprised 6 parts by volume of glycerine, 2 parts by volume of hydrofluoric acid and 1 part by volume of nitric acid. The energy used to accomplish the weld was 638 watt-seconds.

It will be noted from Figure 11 that there is substantially no visible external deformation between the weld zone in the center of the photomicrograph and the unwelded extremities at either side of the center zone, wherein the interface is clearly shown. However, there is substantially complete internal disruption of the interface in the weld zone, with no detectable interfacial line passing through the weld.

While as heretofore indicated, some deformation may be encountered in the welding process of the present invention, particularly where welds of high strength are sought and relatively high clamping pressures and high energy levels are used, the deformation need be in all cases of only minor proportions and is substantially insignificant when compared with the deformation encountered in pressure welding at ambient temperatures.

Figure 12:
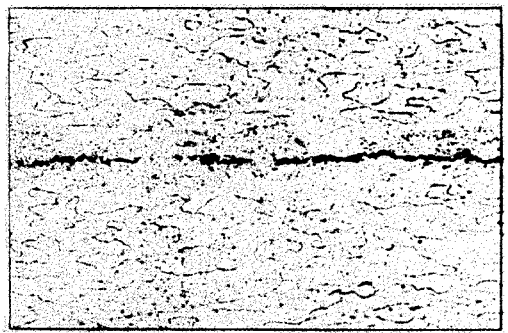

Figure 12 is a photomicrograph (transverse cross-section) of the interfacial region of two 0.032-inch sheets of welded 1100–H14 aluminum, namely aluminum having a nominal composition of 99.0 weight percent of elemental aluminum, magnified 140 times. The etch employed for this photomicrograph was 0.5 volume percent hydrofluoric acid.

Figure 13:
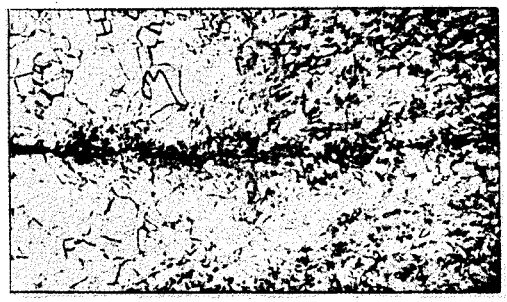

Figure 13 is a photomicrograph through the interfacial region of two 0.010-inch sheets of substantially pure copper, namely elemental copper at least 99.0 weight percent purity. The photomicrograph is magnified 130 times.

Figure 14:

Figure 14 is a photomicrograph through a weld of 2 sheets of 0.010-inch brass (gilding metal) having a nominal composition consisting of 95% by weight of copper and 5% by weight of zinc, which was recrystallized after welding by heating to a temperature of 800° F. for one hour. The magnification is 310 times.

Figure 15:
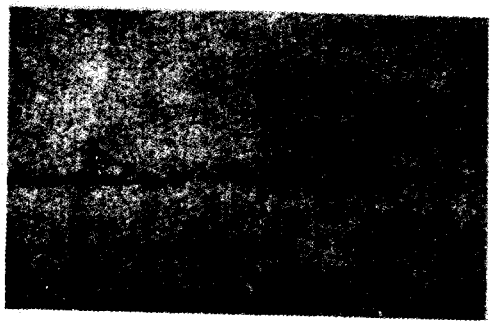

Figure 15 is a photomicrograph of the interfacial region of two 0.032-inch sheets of welded 1100–H14 aluminum, namely aluminum having a nominal composition of at least 99.0 weight percent of elemental aluminum, magnified 180 times, which sheets had been degreased prior to welding. The etch employed for this photomicrograph was 0.5 percent by volume hydrofluoric acid. The energy used to accomplish the weld was 1500 watt-seconds. The weld had an area of 0.037 square inch, a deformation of 2.79%, and a unit shear strength of 6,470 pounds per square inch over the weld area. The weld zone in this soft aluminum reveals coalescing, clumping or bunching of the aluminum oxide surface film consisting of hexagonal crystals interspersed with fragmentary zones where no interface whatever is apparent.

Figure 16:

Figure 16 is a photomicrograph of an edge section through a weld consisting of two 0.032-inch sheets of 5052–H32 aluminum alloy having a nominal composition of 97.25% by weight of aluminum, 2.5% by weight of magnesium and 0.25% by weight of chromium. The photomicrograph is at a magnification of 150 times and the etch employed was 1.0 percent by volume hydrofluoric acid. The energy used to accomplish this weld was 1350 watt-seconds. The weld had a weld area of 0.0152 square inches, a deformation of 1.62%, and a unit shear strength of 15,590 pounds per square inch.

Figure 17:

Figure 17 is a photomicrograph of a weld through two 0.040-inch sheets of M–257 sintered aluminum powder (nominal composition including 7.8 percent by weight of aluminum oxide). The sheets were cleaned prior to welding. The magnification is 400 times and the etch used to obtain this photomicrograph was 0.5 percent by volume of hydrofluoric acid. The weld was accomplished through the application of 2,100 watt-seconds. The weld had a weld area of 0.025 square inch, a deformation of 1.52%, and a unit shear strength of 11,120 pounds per square inch.

Figure 18:
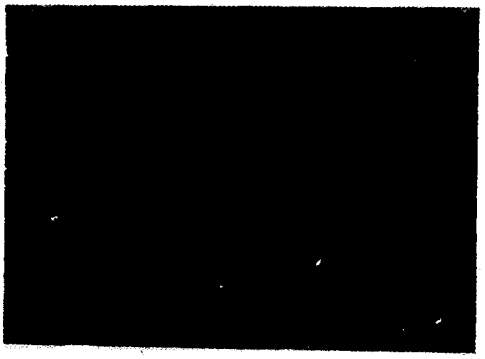

Figure 18 is a photomicrograph of a weld of two 0.016-inch sheets of hard-temper cartridge brass (nominal composition 70 percent by weight of copper and 30 percent by weight of zinc). The photomicrograph is at a magnification of 150 times and the etch used for the photomicrograph was a mixture (by volumes) of 5 parts of 3% ammonium hydroxide solution, 2 parts of 30% hydrogen peroxide solution, and 93 parts of water. The weld was accomplished through the application of 2,100 watt-seconds. The weld had a weld area of 0.010 square inch, a deformation of 9.71%, and a unit shear strength of 30,400 pounds per square inch. It will be seen that in those regions where there was apparently localized cold working, the interface is altogether lost.

Figure 19:

Figure 19 is a photomicrograph of a similar weld to that of Figure 18 except that the weld was recrystallized at 750° F. for one hour. The magnification is 300 times, and the etch is similar to that of Figure 18.

Figure 20:
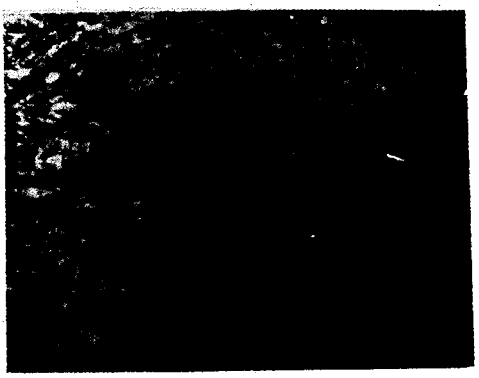

Figure 20 is a photomicrograph of an edge section through a weld between two 0.010-inch sheets of spring-temper cartridge brass. The magnification is 150 times and the etch used for this photomicrograph was the same as that used in Figures 18 and 19. The weld was obtained through the application of 2,100 watt-seconds, and had an area of 0.010 square inch, a deformation of 9.52% and a unit shear strength of 22,570 pounds per square inch. The interface in this weld was apparently entirely disrupted.

Figure 21:
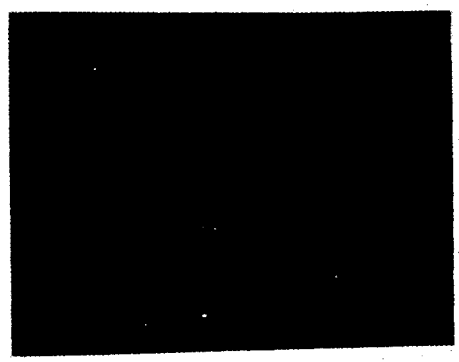

Figure 21 is a photomicrograph of an edge section of a weld between two 0.025-inch sheets of electrolytic copper. The sheets were not cleaned prior to welding. The magnification is 100 times and the etch used therefor was the same as that used in Figures 18 and 19. The weld had a deformation of 5.55%.

Figure 22:
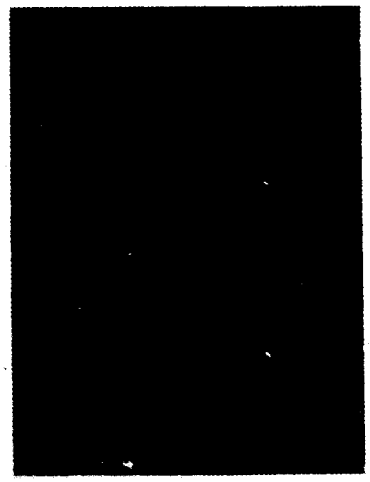

Figure 22 is a photomicrograph of a weld between two 0.025-inch sheets of FS-1h magnesium alloy (nominal composition 3 percent by weight of aluminum, 1 percent by weight of zinc, 0.3% by weight of manganese and the balance is magnesium). The magnification is 150 times and the etch used for the photomicrograph was a mixture by volumes, of 1 part concentrated nitric acid, 20 parts glacial acetic acid and 19 parts ethyl alcohol. The weld was accomplished at 1,350 watt-seconds.

Figure 23:
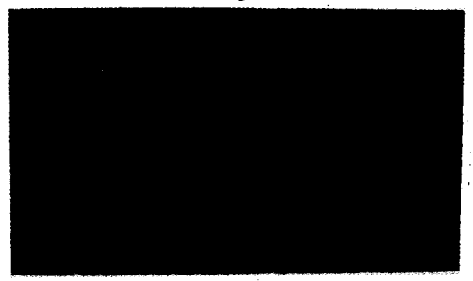

Figure 23 is a photomicrograph through a weld between two 0.010-inch sheets of ferritic stainless steel (an iron-carbon-chromium alloy). In this weld the interface was virtually lost and localized cold working is clearly evident in the interface region. The magnification is 120 times and the etch was a solution of 4 grams of picric acid in 100 cc. alcohol. The energy used to accomplish the weld was 825 watt-seconds. The weld had a deformation of 9.9%.

Figure 24:

Figure 24 is a photomicrograph of a weld similar to that of Figure 23 except that the weld was recrystallized for 30 minutes at a temperature of 1,450° F. The recrystallization and grain growth across the original interface is striking, there is in essence one continuous structure throughout the weld zone. The magnification is 260 times and the etch used was the same as for Figure 23.

Figure 25:

Figure 25 is a photomicrograph through a weld between a 0.008-inch thick gold and platinum alloy and a 0.010-inch thick sheet of ferritic stainless steel (an iron-carbon-chromium alloy). The magnification is 340 times and the etch consisted of 2 percent by weight of picric acid, followed by a mixture of 10 percent by weight of potassium cyanide, and 10 percent by weight of ammonium persulfate. The energy used to accomplish the weld was 1400 watt-seconds.

Figure 26:

Figure 26 is a photomicrograph of a similar weld to that shown in Figure 25 except that the weld was recrystallized at 1,450° F. for 30 minutes. The magnification is 340 times and the etch was similar to that used for the photomicrograph of Figure 25. The diffusion of the gold or platinum into the iron is evident.

Figure 27:

Figure 27 is a photomicrograph through a weld of a sheet of 0.008-inch thick gold-platinum alloy welded to a sheet of 0.008-inch thick nickel. The magnification is 340 times and the etch was a mixture of 10 percent by weight of potassium cyanide, and 10 percent by weight of ammonium persulfate. 1,400 watt-seconds were used to accomplish the weld. The weld had a deformation of 6.67%.

Figure 28:

Figure 28 is a photomicrograph of a weld similar to that of Figure 27 taken at the same magnification and using the same etch, except that the weld was recrystallized at 1,450° F. for 30 minutes. The presence of an alloy layer resulting from interdiffusion is clearly shown.

Figure 29:

Figure 29 is a photomicrograph through a weld of a platinum-tungsten foil having a thickness of 0.001-inch to a copper foil having a thickness of 0.004-inch, the weld being annealed for 30 minutes at 1,450° F. The magnification is 540 times and the etch was the same as for Figure 27.

Figure 30:

Figure 30 is a photomicrograph through a weld of a platinum-tungsten foil having a thickness of 0.001-inch and a 0.016-inch thick sheet of tool steel. The magnification is 540 times and the etch consisted of a 2 weight percent of picric acid solution. The dark zone is apparently sorbitic troosite, and the white zone a spheridite. The weld was made in 1½ seconds. Normally, to change troosite to spheridite it is necessary to have a temperature of about 600° F. for at least one-half hour.

Figure 31:
Figure 32:

In the photomicrographs of Figures 31 and 32, showing a weld according to the invention in a harder (aircraft structural) aluminum, 24S–T4 bare (nominal composition 4.5% copper, 0.6% manganese, 1.5% magnesium, balance aluminum), wherein the weld was accomplished between two sheets each 0.020 inch thick. There is very little evidence of interface remaining in the weld zone even in the "as welded" material illustrated in Figure 31, wherein is shown the microstructure of the interface area magnified 150 times and treated with Keller's etch.

Figure 32 shows the microstructure of the interface area, magnified 150 times, and treated with Keller's etch, after solution heat treatment at a temperature of 920° F. ±10° F. for 20 minutes followed by water-quenching. Within the weld area there is no evidence of a cast structure as ordinarily encountered in normal fusion welding processes. Complete absence of the original interface area and the growth of grains across the area is indicative of the metallurgical continuity of the system. This weld was accomplished with energy of 1050 watt-seconds.

Figure 33:

Figure 33 is a photomicrograph of a weld according to the present invention of two 0.023-inch sheets of titanium-8% manganese alloy. The photomicrograph is at a magnification of 150 times and the etch used for the photomicrograph was a mixture of 1 part by volume of hydrofluoric acid, 2 parts of nitric acid, and 97 parts of water. The weld zone reveals a highly disrupted interface with the oxide film broken up and coalesced.

Figure 34:
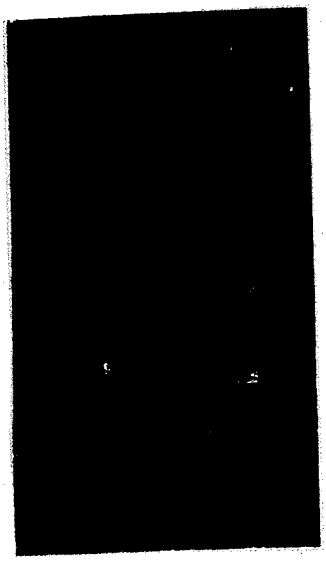

Figure 34 is a photomicrograph of a weld of two sheets of molybdenum, one 0.008-inch thick and one 0.005-inch thick. The etch used consisted of 360 grams potassium ferricyanide, 36 grams sodium hydroxide, and one liter of distilled water, and the magnification is 160 times. The weld zone reveals severe internal working with severe distortion of the original interface.

Figure 35:
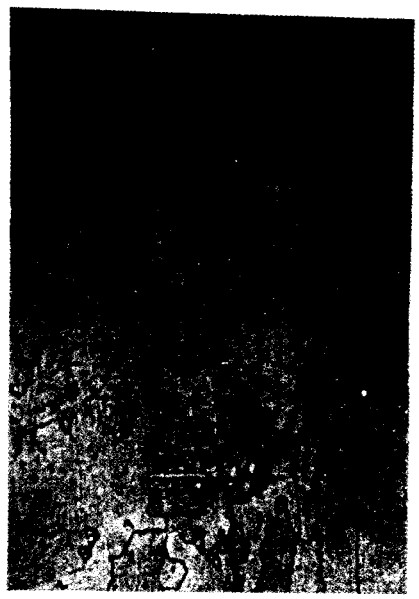

Figure 35 is a photomicrograph of a weld similar to that of Figure 34 except that the weld was heat treated for two hours at 2150° F. in a hydrogen atmosphere. The magnification is 250 times and the etch used was similar to that used for Figure 34. The hydrogen annealing has lead to grain growth which completely eliminates the interface.

Each of the welds shown in the photomicrographs in Figures 11 through 35 inclusive, was performed without the application of heat, either prior to or during the welding.

The foregoing photomicrographs comprise a random selection of photomicrographs of welds which may be made in accordance with the process of the present invention. As above-indicated a wide variety of metals, including dissimilar metals may be welded by the process of the present invention, and welds comprising metal foils or metal sheets having a broad range of thicknesses may be accomplished by the subject process.

The chemical and physical properties possessed by the welds of the present invention were excellent. For example, the corrosion resistance of pure aluminum welded in accordance with the present invention in environments of aerated distilled water, and 3% salt solution at elevated temperatures was exceptionally good. Thus, a set of 150 specimens of welded 0.010 inch pure aluminum sheet were immersed in aerated distilled water maintained at 95° C. for periods of up to 5,654 hours of continuous exposure, with no significant change in weld strength.

Further tests were conducted involving welded lap specimens of 0.010 to 0.032 inch of pure aluminum sheet, which were suspended in 95° C. aerated distilled water for periods of up to 3,748 hours with no loss in weld strength.

A test involving 90 specimens of welded 0.010 inch pure aluminum sheet in a 3% solution of sodium chloride in distilled water maintained at 40° C. for periods of up to 4,014 hours likewise failed to reveal any deleterious effect upon the weld strengths.

The weld area may be increased to a certain degree by increasing the welding tip size, energy level, and clamping load. Simultaneously, the fracture load is also increased by increasing the tip size, energy level, and clamping load.

There appears to be an optimum static force, readily ascertainable by a few preliminary tests, for each tip radius and type of metal, although welding can be accomplished, as heretofore noted, within a wide range of clamping pressures.

In the various illustrated embodiments the tips of the vibration transmitting member which is applied to the elements being welded are shown as spherically-curved tip ends. We have found that the use of spherically-curved tip ends is advantageous for many welding applications. However, for specific welds having designs of unusual shape or form, alternative tip ends may be substituted. Furthermore, varying the tip shape to some degree influences the type of weld which is obtainable. For example, employing spherically-curved tips we have found that the optimum tip size for the welding of thin pure aluminum sheets and thin gages of other metals is generally a spherically-curved tip having a 3-inch radius. On the other hand, with harder metals, metals with higher modulus and thicker metals, spherically-curved tips of smaller radii appear to somewhat improve the weldability. For example, with nickel, optimum welding has been achieved with tips having a 1-inch radius. However, the influence of tip shape is normally not critical and good welds may be accomplished over a wide range of tip sizes and shapes, although in some cases preliminary testing to determine the optimum tip size and shape may improve the resultant welds obtained from a given apparatus embodiment.

We have found that the various apparatus embodiments disclosed herein are generally force insensitive. Thus, there will be no appreciable loss of energy from the system or an unacceptable shift in the resonant frequency of the welding apparatus at the operating pressures.

Operation at the design resonant frequency of an apparatus embodiment is to be preferred, particularly with the welding of thicker metal sheets. However, some deviation from the design frequency may be tolerated particularly in the welding of relatively thin metal sheets.

The welding process of the present invention may be effected upon metals which have not undergone the precleaning treatment required for other types of welding. For example, aluminum sheets have been welded in accordance with the process of the present invention in the "As Received" condition from the mill, with surface greases and other surface contaminants present, and welds have been accomplished on solution-treated, and solution-treated and aged Inconel X[6] in which the resulting oxides were not removed from the metal before welding. As heretofore noted, it is desirable that certain surface cleaning operations be used to give a metal that is reasonably free from contaminants.

This application is a continuation in part of our co-pending application Serial No. 467,382 filed November 8, 1954, now abandoned, for "Method and Apparatus Employing Vibratory Energy For Bonding Materials."

The present invention may be embodied in other specific forms without departing from the spirit or essential attributes thereof and, accordingly, reference should be made to the appended claims, rather than to the foregoing specification as indicating the scope of the invention.

By "faces" of metal members as used in the following claims we mean the principal surfaces of the metal members and not their edges or end surfaces.

We claim:

1. A non-fusion method for welding metal members together which method comprises placing to-be-welded faces of the metal members together, applying a force to the metal members in a direction and of a magnitude to hold the contacting to-be-welded faces of the metal members in intimate contact at the intended weld zone and to couple mechanical vibratory energy into said zone, and introducing through a vibrating element contacting one of the to-be-welded metal members adjacent the weld zone mechanical vibration having a frequency of between about 59 and 300,000 cycles per second, said mechanical vibration comprising a vibration component in a direction substantially perpendicular to the direction of applied force, and with such component being of an energy level sufficient to weld the metal members to each other.

2. A method in accordance with claim 1 in which the mechanical vibration has a frequency of between about 400 and 75,000 cycles per second.

3. A method in accordance with claim 1 in which the time duration in which the mechanical vibration is introduced to the weld zone is within the time range of between about 0.001 second to about 6.0 seconds.

4. A method in accordance with claim 1 in which the mechanical vibration is continuous wave vibration.

5. A method in accordance with claim 1 in which the amount of the holding force is below the amount necessary to produce ten percent deformation in the metal members when the welding is completed.

6. A method in accordance with claim 1 in which the mechanical vibration disrupts the interface between the contacting metal members whereby the metal members are welded together in the region of the disrupted interface.

7. A method in accordance with claim 1 in which at least one of the metal members which is welded comprises aluminum.

8. A method in accordance with claim 1 in which at least one of the metal members which is welded comprises copper.

9. A method in accordance with claim 1 in which at least one of the metal members which is welded comprises iron.

10. A method in accordance with claim 1 in which at least one of the metal members which is welded comprises titanium.

11. A method in accordance with claim 1 in which the metal members which are welded together include dissimilar metals.

12. A method in accordance with claim 1 in which at least one of the metal members which is welded has a thickness of below about 0.100 inch.

13. A method in accordance with claim 1 in which a plurality of the metal members which are welded comprise metals having a thickness of below about 0.100 inch.

14. A method in accordance with claim 1 in which at least one of the metal members which is welded has a thickness of below about 0.005 inch.

15. A method in accordance with claim 1 in which a plurality of the metal members which are welded comprise metals having a thickness of below about 0.005 inch.

16. A method in accordance with claim 1 in which the welding is initiated while the metal members to be welded are at room temperature.

---

[6] A nickel alloy having a nominal composition of 73 weight percent nickel, 7 weight percent iron, 15 weight percent chromium, and minor amounts of aluminum, silicon, manganese, carbon, sulfur, columbium and titanium.

17. A method in accordance with claim 1 in which the welding is initiated while the metal members to be welded are at a temperature above room temperature but below the melting temperature of any of the metal members to be welded.

18. A method in accordance with claim 1 in which the welding is effected in an inert gaseous atmosphere.

19. A method in accordance with claim 1 in which the mechanical vibration has a frequency of between 400 and 75,000 cycles per second and is continuous wave vibration, and in which the time duration in which the mechanical vibration is introduced into the weld zone is within the time range of between about 0.001 second to about 6.0 seconds.

20. A method in accordance with claim 19 in which the amount of the holding force is below the amount necessary to produce ten percent deformation in the metal members when welding is completed.

21. A method for welding metal members together which method comprises holding contacting to-be-welded faces of the metal members together between a pair of jaws with a force of a magnitude and direction to hold the to-be-welded faces of the metal members in intimate contact at the intended weld zone and to couple mechanical vibratory energy into said zone, and introducing substantially continuous wave mechanical vibration having a frequency of between about 59 and 300,000 cycles per second to said intimately contacted metal members through at least one of said jaws which is engaged with an outer face of one of the metal members adjacent the intended weld zone, said substantially continuous wave mechanical vibration comprising a vibration component in a direction substantially perpendicular to the direction of the holding force and with such component being of an energy level sufficient to weld the metal members to each other with the temperature in the weld zone (such temperature being that which can be determined with a thermocouple) during the introduction of the vibration being below the melting temperature of any of the metal members.

22. A method in accordance with claim 21 in which the mechanical vibration has a frequency of between about 400 and 75,000 cycles per second, and in which the time duration in which the mechanical vibration is introduced into the weld zone is within the time range of between about 0.001 second to about 6.0 seconds.

23. A method in accordance with claim 22 in which the amount of the holding force is below the amount necessary to produce ten percent deformation in the metal members when welding is completed.

24. A method for welding metal members together, which method comprises holding contacting to-be-welded juxtaposed faces of the metal members together with a force which is sufficient to hold the contacted to-be-welded faces of the metal members in intimate contact and to couple mechanical vibration into the to-be-welded metal members in the zone to be welded, and introducing to said intimately contacted metal members mechanical vibration having a frequency of between about 59 and 300,000 cycles per second comprising a vibratory component which is substantially parallel to the interface between the contacting metal members, with said vibratory component being at a sufficient energy level to weld the metal members to each other with the temperature in the weld zone (such temperature being that which can be determined with a thermocouple) during the introduction of the vibration being below the melting temperature of any of the metal members.

25. A method in accordance with claim 24 in which the mechanical vibration comprises continuous wave vibration.

26. A method in accordance with claim 25 in which the mechanical vibration has a frequency of between about 400 and 75,000 cycles per second, and in which the time duration in which the mechanical vibration is introduced into the weld zone is within the time range of between about 0.001 second to about 6.0 seconds, and in which the amount of the holding force is below the amount necessary to produce ten percent deformation in the metal members when welding is completed.

27. Apparatus for non-fusion welding contacting metal members together comprising a force-applying member, means for impelling an end portion of said force-applying member against an outer face of one of said contacting metal members with a force in a direction and of a magnitude to hold the to-be-welded faces of the metal members in intimate contact at the intended weld zone and to couple mechanical vibratory energy into the intended weld zone, and means for vibrating said end portion of said member at a frequency of between about 59 and 300,000 cycles per second in a path substantially perpendicular to the direction of the applied force while such to-be-welded faces of the metal members are being held in intimate contact by engagement with said end portion of said member, with said vibrating means furnishing sufficient power so that the mechanical vibration delivered by said end portion in said path is at a sufficient energy level to weld the metal members together.

28. Apparatus in accordance with claim 27 in which the vibrating means vibrates the force-applying member at a frequency of between 400 and 75,000 cycles per second.

29. Apparatus in accordance with claim 27 which includes time control means for limiting the vibration of the force-applying member to a time period of between 0.001 second to 6.0 seconds in connection with the formation of a single weld.

30. Apparatus in accordance with claim 27 which includes heating means for heating the metal members prior to the application of the mechanical vibratory energy to such metal members to a temperature of above room temperature and below the melting temperature of any of the metal members.

31. Apparatus in accordance with claim 27 in which the vibrating means comprises a magnetostrictive transducer.

32. Apparatus in accordance with claim 27 in which the vibrating means comprises a piezoelectric ceramic transducer.

33. Apparatus in accordance with claim 27 which includes a fixed support means spaced from the end portion of the force-applying member, the apparatus being constructed and arranged so that the contacting metal members are disposed intermediate the end portion of the force-applying member and said support means during welding.

34. Apparatus in accordance with claim 27 which includes means for deflecting the end portion of the force-applying member.

35. Apparatus in accordance with claim 27 in which the force-applying member comprises an elongated reed which is angularly disposed in respect to the vibrating means, and which includes a coupling member fixedly secured to both said reed and to said vibrating means, with said vibrating means being engaged with said coupling member at a point remote from the engagement between the coupling member and the reed, and with said vibrating means vibrating said reed through said coupling member.

36. Apparatus in accordance with claim 27 in which the coupling member is substantially perpendicularly disposed to the longitudinal axis of the reed.

37. Apparatus in accordance with claim 27 in which the force-applying member is unsymmetrical.

38. Apparatus in accordance with claim 27 which includes a fixed support means spaced from and juxtaposed to the end portion of the force-applying member, with the apparatus being constructed and arranged so that the contacting metal members are disposed intermediate the end portion of the force-applying member and said support means during welding, the longitudinal axis of the force-applying member being axially disposed in respect to the juxtaposed surface of the support means at an angle of less than ninety degrees, and with the vibrating means being secured to a portion of the force-applying member remote from said end portion.

39. Apparatus in accordance with claim 38 in which the force-applying member is tapered, with its tapering portion of relatively large cross-section being towards the vibrating means, and its tapering portion of relatively small cross-section being towards its end portion.

40. Apparatus in accordance with claim 38 which includes a support mount for supporting the force-applying member, said support mount comprising a resonant member having a length equal to even multiples of one-quarter wavelength according to the properties of the material of which such mount is made at the frequency at which the vibrating means vibrates the force-applying member, said mount having one end attached to the force-applying member, and with the other end of said mount being free from attachment to establish a node when the force-applying member is being vibrated for anchoring said mount to anchorage means.

41. Apparatus for non-fusion welding contacting metal members together comprising a force-applying member, means for impelling an end portion of said force-applying member against an outer face of one of said contacting metal members with a force in a direction and of a magnitude to hold the to-be-welded faces of the metal members in intimate contact at the intended weld zone and to couple mechanical vibratory energy into the intended weld zone, and means for vibrating said end portion of said member with continuous wave vibration having a frequency of between about 59 and 300,000 cycles per second in a path substantially perpendicular to the direction of the applied force while such to-be-welded faces of the metal members are being held in intimate contact by engagement with said end portion of said member, with said vibrating means furnishing sufficient power so that the mechanical vibration delivered by said end portion in said path is at a sufficient energy level to weld the metal members together.

42. Apparatus in accordance with claim 41 in which the vibrating means vibrates the force-applying member at a frequency of between 400 and 75,000 cycles per second.

43. Apparatus in accordance with claim 42 which includes time control means for limiting the vibration of the force-applying member to a time period of between 0.001 second to 6.0 seconds in connection with the formation of a single weld.

44. Apparatus in accordance with claim 43 which includes a fixed support means spaced from the end portion of the force-applying member, the apparatus being constructed and arranged so that the contacting metal members are disposed intermediate the end portion of the force-applying member and said support means during welding.

45. Apparatus in accordance with claim 42 in which the force-applying member comprises an elongated reed which is angularly disposed in respect to the vibrating means, and which includes a coupling member fixedly secured to both said reed and to said vibrating means, with said vibrating means being engaged with said coupling member at a point remote from the engagement between the coupling member and the reed, and with said vibrating means vibrating said reed through said coupling member.

46. Apparatus in accordance with claim 45 in which the coupling member is substantially perpendicularly disposed to the longitudinal axis of the reed.

47. Apparatus in accordance with claim 42 which includes a fixed support means spaced from and juxtaposed to the end portion of the force-applying member, with the apparatus being constructed and arranged so that the contacting metal members are disposed intermediate the end portion of the force-applying member and said support means during welding, the longitudinal axis of the force-applying member being axially disposed in respect to the juxtaposed surface of the support means at an angle of less than ninety degrees, and with the vibrating means being secured to a portion of the force-applying member remote from said end portion.

48. Apparatus in accordance with claim 47 in which the force-applying member is tapered inwardly, with its tapering portion of relatively large cross-section being towards the vibrating means, and its tapering portion of relatively small cross-section being towards its end portion.

49. Apparatus in accordance with claim 47 which includes a support mount for supporting the force-applying member, said support mount comprising a resonant member having a length equal to even multiples of one-quarter wavelength according to the properties of the material of which such mount is made at the frequency at which the vibrating means vibrates the force-applying member, said mount having one end attached to the force-applying member, and with the other end of said mount being free from attachment to establish a node when the force-applying member is being vibrated for anchoring said mount to anchorage means.

50. Apparatus in accordance with claim 43 in which the vibrating means comprises a magnetostrictive transducer.

51. Apparatus in accordance with claim 43 in which the vibrating means comprises a piezoelectric ceramic transducer.

52. A non-fusion welding device including a pair of juxtaposed jaws between which a plurality of metal members to be welded are placed, means for impelling one jaw toward the other jaw with sufficient force to hold the to-be-welded faces of the metal members in intimate contact at the intended weld zone and to couple mechanical vibration into the intended weld zone when such metal members are interposed between said jaws, means for vibrating the juxtaposed end of at least one of said jaws at a frequency of between about 59 and 300,000 cycles per second in a path substantially parallel to the interface of the metal members being welded while such metal members are interposed between the juxtaposed ends of said jaws, with the mechanical vibratory energy delivered from said end of said jaw in a path substantially parallel to the interface of the metal members being welded being at such an energy level that the contacting to-be-welded faces of the metal members are welded together.

53. A non-fusion welding device in accordance with claim 52 in which the vibrating means vibrates the said one end of said jaw at a frequency of between about 400 and 75,000 cycles per second.

54. A non-fusion welding device in accordance with claim 52 in which the vibrating means vibrates said juxtaposed end of said one jaw with continuous wave vibration.

55. A non-fusion welding device in accordance with claim 54 which includes time control means for limiting the vibration of said one jaw to a time period of between about 0.001 second to about 6.0 seconds in connection with the formation of a single weld.

56. A non-fusion welding device in accordance with claim 55 in which the vibrating means comprises a magnetostrictive transducer.

57. A non-fusion welding device in accordance with claim 55 in which the vibrating means comprises a piezoelectric ceramic transducer.

58. A non-fusion welding device in accordance with claim 54 in which vibrating means vibrate each of said pair of juxtaposed jaws.

59. A non-fusion welding device in accordance with claim 55 in which said one jaw comprises an elongated reed, and in which the welding device includes a coupling member fixedly secured to said reed, said coupling member being axially disposed at an angle to the longitudinal axis of said reed, with the vibrating means being fixedly secured to said coupling member at a point remote from the point of securement of said coupling member to said reed.

60. A non-fusion welding device in accordance with claim 55 in which said one jaw is axially disposed in respect to the other jaw at an angle of less than ninety degrees, and in which the vibrating means is axially engaged with said one jaw at a point remote from its juxtaposed end.

References Cited in the file of this patent

UNITED STATES PATENTS

| | | |
|---|---|---|
| 2,522,082 | Arnold | Sept. 12, 1950 |
| 2,619,604 | Burns | Nov. 25, 1952 |
| 2,632,858 | Calosi | Mar. 24, 1953 |
| 2,651,148 | Carwile | Sept. 8, 1953 |
| 2,670,446 | Turner | Feb. 23, 1954 |
| 2,680,333 | Calosi | June 8, 1954 |
| 2,707,821 | Sowter | May 10, 1955 |
| 2,819,961 | Bartels | Jan. 14, 1958 |

FOREIGN PATENTS

| | | |
|---|---|---|
| 1,087,439 | France | Aug. 25, 1954 |
| 1,087,440 | France | Aug. 25, 1954 |

OTHER REFERENCES

Welding Journal, October 1959, pp. 969–975.